D. B. SANDERS.
Feather-Renovator.

No. 210,564. Patented Dec. 3, 1878.

Witnesses:
Elias Hewitt
Fred. G. Dietrich

Inventor
Daniel B. Sanders
by B. F. Welles att'y

UNITED STATES PATENT OFFICE.

DANIEL B. SANDERS, OF BURLINGTON, MICHIGAN.

IMPROVEMENT IN FEATHER-RENOVATORS.

Specification forming part of Letters Patent No. 210,564, dated December 3, 1878; application filed July 23, 1878.

*To all whom it may concern:*

Be it known that I, DANIEL B. SANDERS, of Burlington, county of Calhoun, and State of Michigan, have invented certain new and useful Improvements in Feather-Renovators; and I do hereby declare the following to be a full, clear, and exact description of the same, reference being made to the accompanying drawing, forming a part of this specification, and in which—

Figure 1:
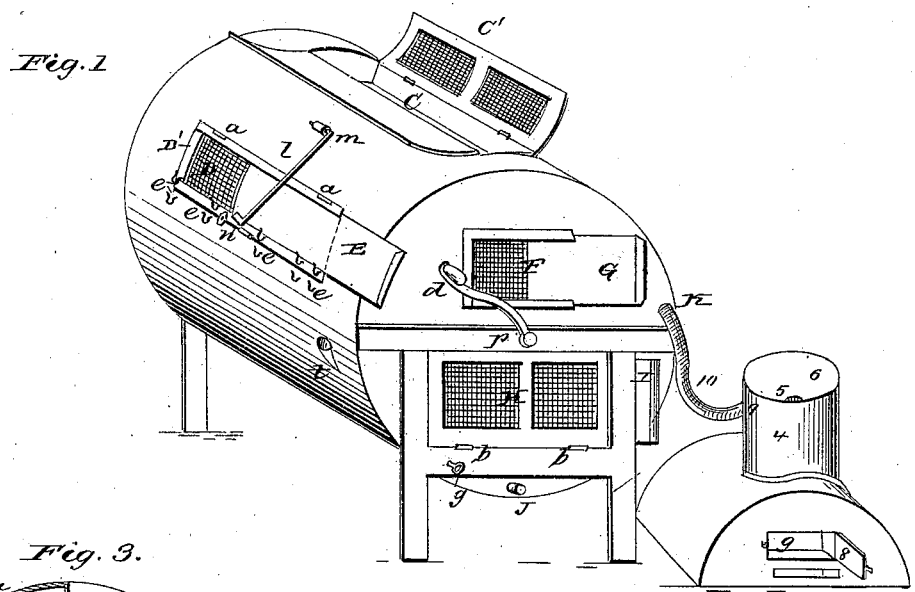
Figure 3:
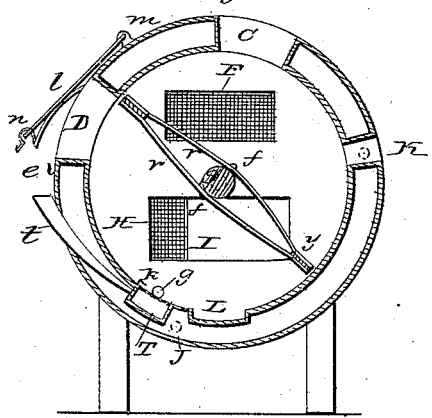
Figure 2:
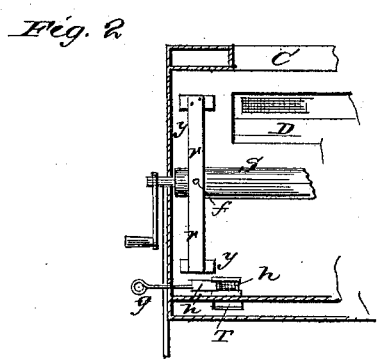
Figure 4:
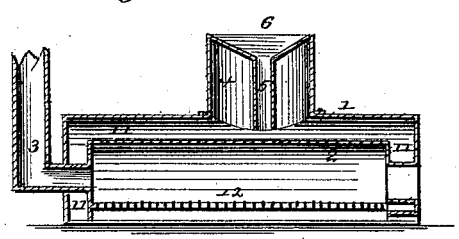
Figure 5:
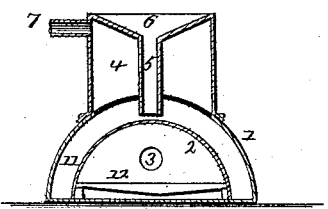

Figure 1 is a general perspective view. Fig. 2 is a partial longitudinal section of the feather-holder; Fig. 3, a cross-section of the same. Fig. 4 is a longitudinal section of the steam-generator; Fig. 5, a cross-section of the same.

My invention relates to an apparatus wherein steam is used as a cleansing agent, and is an improvement on the invention of Daniel B. Sanders and Junius Smith, for which Letters Patent of the United States No. 200,411 were granted; and the invention consists in the general construction and arrangement of parts, as will be hereinafter fully described.

To enable others skilled in the art to make and use my invention, I will now describe the exact manner in which it is carried out.

The feather-holder is composed of two concentric cylinders, of such relative diameters as to leave a small space between, the inner cylinder being the feather-receptacle proper.

The stirrer is composed of a shaft, S, having a series of arms, $r\ y$, arranged in a spiral manner and at regular intervals upon said shaft.

F and H represent gauze coverings in each of the heads of the feather-holder. The upper gauze covering, F, is secured permanently over the opening in the head, and a slide, G, serves to close said opening when required. The lower covering, H, is a gauze-covered hinged door, while a close-fitting slide, I, sliding in grooves in the head, serves to close the opening securely.

The opening C, which serves both as a ventilator and as a place to introduce the feathers, is closed by a gauze-covered frame, C′, and a tight door, both being hinged, as shown.

Opening D is closed by a door, D′, covered with gauze, and hinged at $a\ a$ along its upper margin, and a close-fitting slide, E, working in grooves or flanges on the outer surface of the door-frame, serves to close said opening when required.

A small bar, $l$, hinged at $m$ to the body of the feather-holder, and having a hook, $n$, at its opposite end, is made to engage with a loop in the lower margin of the door to hold it partially open, as shown in Fig. 3.

The oil-box T is attached to the lower surface of the inner cylinder or feather-receptacle proper, and opens into it by a wide mouth covered with gauze $h$, and is provided with a tight cover, $h'$, sliding in guides, and operated from the outside by a small hand-rod, $g$, having a ring turned upon its outer end. A small tube, $t$, communicating with the box T, serves to introduce oil in the box.

K, Fig. 1, represents a tube communicating with a tight compartment extending the entire length of the cylinder. This compartment forms a narrow steam-chest, and a series of small perforations along its entire length gives it steam communication with the feather-receptacle.

J represents a tube communicating with the general space between the two concentric cylinders.

At the bottom of the feather-receptacle a shallow trough, L, is formed for collecting the refuse and filth removed from the feathers during the process of cleansing.

The stirrer has each of its arms formed of two thin strips of wood, $r\ r$, gained into the round shaft S, and secured by a bolt, $f$. A block of thin wood, $y$, is then placed between the ends of saids arms, and secured thereto, thus making a very light and stiff pair of arms.

The steam-generator is composed of two concentric semi-cylinders, 1 and 2, of sheet metal, provided with a steam-dome, 4, secured to the outer shell. The top or head 6 of this dome is funnel-shaped, with a tube, 5, extending down nearly to the inner shell, 2. The inner shell, 2, forms the roof and sides of the fire-box. 8 and 9 are the door and opening for introducing fuel. The opening 3 in the back end is the exit for smoke, leading to the smoke-stack. 7 is the steam-pipe, and 10 is a flexible tube leading to the feather-holder. The funnel 6 and its tube 5 serve both as a means of supplying water to the boiler and as a pressure-gage and safety-valve.

The operation of the apparatus is as follows: The boiler is filled to about the water-line and steam raised. The feathers are put in at the opening C, and all the openings tightly closed. The flexible tube 10 is then attached to steam-pipe 7 and introduced into the tube K, when the steam is distributed among the feathers until they are thoroughly saturated. The stirrer made use of keeps the feathers in constant motion until they are thoroughly washed. Then the tube 10 is transferred to the tube J, distributing the steam in the space between the two cylinders to keep up the temperature and subject the feathers to a sweating process. When the feathers are judged to be thoroughly cleansed the ventilating-openings are all opened, and by turning the stirrer gently the feathers are rapidly dried. The ventilators are again closed, and a small quantity of volatile oil is put in at $t$, and the slide $g$ drawn, when, by means of the heated steam immediately in contact with the oil-box T, an oily vapor is diffused through the mass of dried feathers, restoring to them their original life and pliability.

The door D E is then raised and fastened by means of the rod $l$, and the tick secured upon the hooks $e$ $e$, and, the ventilators in the heads being opened, a few left-handed turns of the stirrer will empty the feathers into the tick by means of a blast produced as in a common fanning-mill.

Should the steam rise so as to give undue pressure, forcing the water up the tube 5, indicating too high a temperature, a small quantity of cold water poured into the funnel 6 reduces the temperature and obviates any difficulty there.

Having thus described my invention, I do not broadly claim the gauze-covered openings, nor spirally-armed stirrers, nor the use of an oil-box for evaporating oils, nor the combination of a feather-renovator and steam-generator; but

What I do claim as new, and desire to secure by Letters Patent, is—

1. The rod $l$, in combination with the door D, arranged substantially as and for the purpose herein shown and described.

2. The combination, with the feather-receptacle of a feather-renovator, of the oil-box T, wholly within the steam-space, and provided with a gauze top and sliding cover, and supply-tube $t$, substantially as and for the purpose herein shown and described.

3. In combination with and forming an essential part of a feather-renovator, the within-described steam-generator, formed of two concentric semi-cylinders, having its steam-dome 4 provided with a funnel-shaped top, 6, pressure and supply tube 5, and flexible tube 10, the several parts constructed and relatively arranged to operate substantially as and for the purpose specified.

DANIEL B. SANDERS.

Witnesses:
JOSEPH EDDY,
B. F. WELLES.